(No Model.)

C. BAUMGARTEN.
COTTON BALING PRESS.

No. 302,880. Patented July 29, 1884.

WITNESSES:
H. B. Brown
Geo. H. Evans

INVENTOR:
C. Baumgarten
BY Munn & Co.
ATTORNEYS.

United States Patent Office.

CHRISTIAN BAUMGARTEN, OF SCHULENBURG, TEXAS.

COTTON-BALING PRESS.

SPECIFICATION forming part of Letters Patent No. 302,880, dated July 29, 1884.

Application filed November 8, 1883. (No model.)

*To all whom it may concern:*

Be it known that I, CHRISTIAN BAUMGARTEN, of Schulenburg, in the county of Fayette and State of Texas, have invented a new and Improved Cotton-Baling Press, of which the following is a full, clear, and exact description.

My invention consists of an improved construction of hydraulic baling-presses, whereby it is designed to provide simple and more durable and reliable presses of this kind than any now in use, as hereinafter fully described and claimed.

Figure 1:
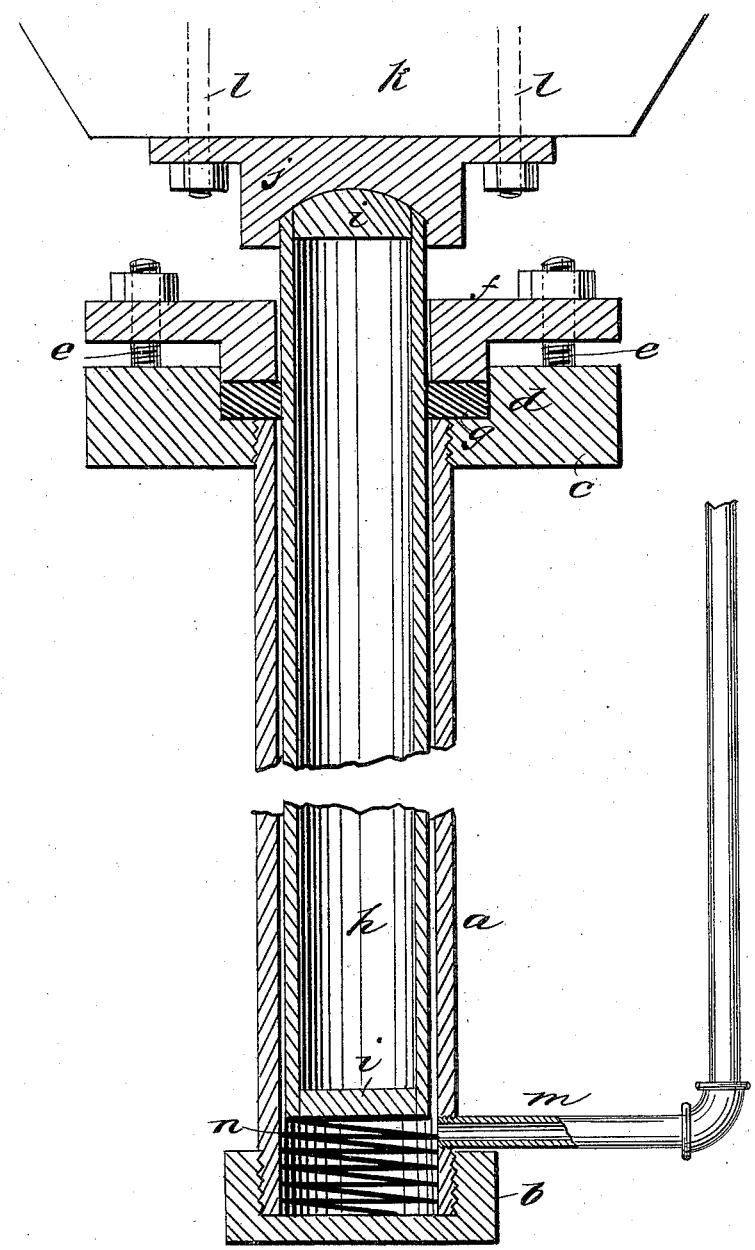
Figure 2:
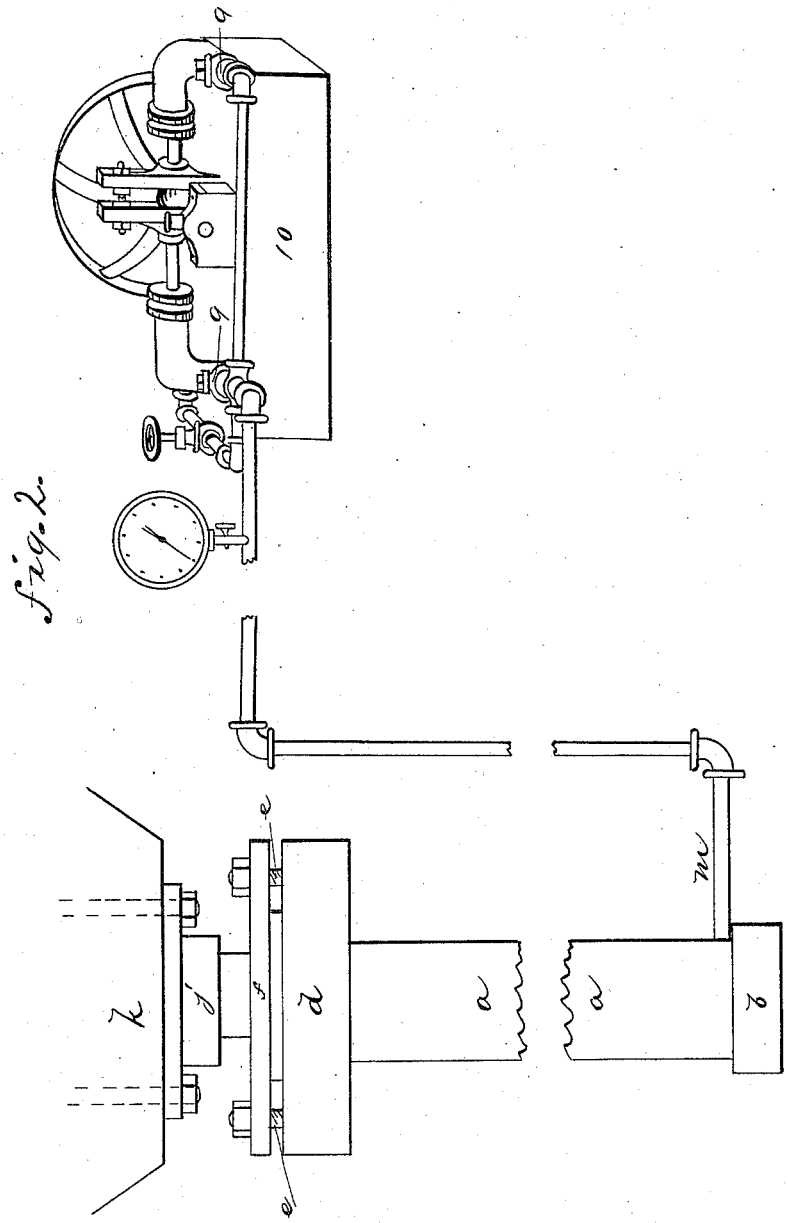

Reference is to be had to the accompanying drawings, forming a part of this specification, in which Figure 1 is a sectional elevation of the hydraulic apparatus of the said press constructed according to my invention; and Fig. 2 is a side elevation of the press with an ordinary force-pump, 10, and check-valves 9 connected therewith, the pipe being broken away in places.

I take a simple tube, $a$, of suitable size and length, and fit it with screw-threads on each end, and close it hermetically at the lower end with a cap, $b$, screwed thereon. To the upper end I screw on a strong collar, $c$, having an annular recess, $d$, in the upper side, around the hole into which the upper end of the tube screws, said collar also having suitable screw-tapped holes for reception of stud-bolts $e$, by which to screw down the gland $f$ on a ring of elastic packing, $g$, which I place in said recess, said ring being a plain flat ring. In this tube $a$, I fit another tube, $h$, for a piston, said tube $h$ being closed at the ends by plugs $i$, welded in or otherwise suitably attached, and on the head I seat a metal cup, $j$, having a socket to connect with the piston by simply resting on it, and to the cap I attach the follower $k$ by bolts $l$. I also propose to arrange a strong coiled steel spring, $n$, in the bottom of tube $a$, under the piston $h$, to check the piston and prevent damage in case it should accidentally fall too rapidly, and to prevent the piston from falling below and closing pipe $m$. The rest of the press, consisting of the case, head, and the holding mechanism for the case and head, may be of any approved form of construction.

At the lower end of the outer tube, $a$, I connect the pipe $m$, by which the water or other fluid is to be forced in to raise the piston. The pipe will have a check-valve located in any convenient part, and will connect with a pump for forcing in the liquid, and the pipe will be contrived to allow the check-valve to be raised to allow the water to flow back through the pump or through any passage to be opened in said pipe for the escape of the fluid, when the follower is to be lowered again.

The packing $g$, when worn out, may be replaced by simply removing the follower $k$ and cap $j$, which allows the gland $f$ to be removed, and also the packing-ring, and permits the new packing-ring to be put on.

The cylinder $a$ may be placed in a pit, with the collar or flange $c$ at the surface of the ground, so that the follower and case may be arranged low down on the ground-floor when it may be desired to do so.

I am aware that the cylinder of a hydraulic press has been formed in one piece, with a packing-seat around its inner top edge, and that a ring was bolted on top of the cylinder, and was provided with a downward-projecting tongue to fit within the packing-seat, a solid piston fitted within the cylinder, and was recessed on its top to receive a boss on the under side of the follower; also, that springs have been placed beneath an elevator to lessen the shock in case the elevator should drop suddenly, and I do not desire to claim, broadly, any such construction as of my invention.

Having thus described my invention, I claim as new and desire to secure by Letters Patent—

The combination of the cylinder, screw-threaded at its ends, screw-cap $b$ on its lower end, recessed collar $c\,d$ on its upper end, packing-ring $f$, and suitable packing, $g$, with the hollow piston $h$, closed at both ends by plugs $i$, and rounded at its upper end, and the recessed follower-cap $j$, substantially as set forth.

CH. BAUMGARTEN.

Witnesses:
REINER JANNES ZIMMERMANN,
LOUIS SCHLOTTMANN.